United States Patent
Zhu et al.

(10) Patent No.: US 6,554,495 B1
(45) Date of Patent: Apr. 29, 2003

(54) OPTICAL CONNECTOR WITH SLIDABLE SHIELDING DOOR

(75) Inventors: ZiQiang Zhu, Kunsan (CN); Guohua Zhang, Kunsan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/020,534

(22) Filed: Dec. 13, 2001

(30) Foreign Application Priority Data

Oct. 31, 2001 (TW) ...................................... 90218617 U

(51) Int. Cl.⁷ ............................................. G02B 6/255
(52) U.S. Cl. .............................. 385/92; 385/88; 385/78; 385/72
(58) Field of Search ..................... 385/88–94, 78, 385/72; 439/138, 135

(56) References Cited

U.S. PATENT DOCUMENTS 6,206,577 B1 * 3/2001 Hall, III et al. ........... 385/88 X
6,474,876 B1 * 11/2002 Sikorski, Jr. .............. 385/92 X

* cited by examiner

*Primary Examiner*—Phan T. H. Palmer
(74) *Attorney, Agent, or Firm*—Wei Te Chung

(57) ABSTRACT

A plastic optical fiber connector (3) includes a housing (32) defining a cavity (35) therein for receiving a complementary optical fiber plug (4), an active device (33) embedded in a rear of the housing, and a shielding door (31) disposed at a front of the housing. The shielding door includes two parallel slots (314) defined in opposite side walls (315) thereof, and a shaft (313) extending through the slots. Opposite ends of the shaft are fixed in a front portion of the housing. When the optical fiber plug is to be inserted into the cavity of the housing, the shielding door is manually rotated outwardly and upwardly from a closed position to an open position, and then slid into the housing. Once the optical fiber plug is withdrawn from the optical fiber connector, the shielding door is manually slid outwardly, and then rotatingly returned to its original closed position.

16 Claims, 8 Drawing Sheets

OPTICAL CONNECTOR WITH SLIDABLE SHIELDING DOOR

BACKGROUND OF THE INVENTION

1. Field of the Invention

The present invention relates to optical fiber receptacle connectors for receiving optical fiber plug connectors, and more particularly to a plastic optical fiber receptacle connector having a rotatable and slidable shielding door.

2. Description of Prior Art

Optical fiber connectors are an important part of optical fiber communications systems. For instance, such connectors may be used as joints in long-distance optical fiber routing; to connect optical fibers to passive devices such as switches and attenuators; or to connect optical fibers to active devices such as radiation sources and detectors.

When an optical fiber connector is used for removably coupling an active device with an optical fiber plug, the optical fiber connector normally has a shielding door for preventing dust and other foreign matter from entering the optical fiber connector. Dust and other foreign matter adversely affect the performance of active devices inside the optical fiber connector.

FIG. 1 shows a plastic optical fiber connector disclosed in Japan Patent Application JP-A-6-331859. The plastic optical fiber connector comprises a housing 1 having a bottom wall 12, two sidewalls 14 extending upwardly from the bottom wall 12, a top wall 11, and a rear wall (not labeled) integrally connecting the top wall 11 and the sidewalls 14. A space 16 is defined in the housing 1 for receiving a complementary optical fiber plug 2. An active device 17 is embedded in the rear wall of the housing 1. A shielding door 13 is pivotably positioned at a front of the housing 1. Once an optical fiber plug 2 is withdrawn from the optical fiber connector, the shielding door 13 is closed to avoid entry of dust into the optical fiber connector. When the optical fiber plug 2 is inserted into the housing 1, the shielding door 13 is rotated to an open position. However, once the optical fiber plug 2 is received in the optical fiber connector, the shielding door 13 remains entirely outside the housing 1. As a result, an unduly large amount of space is occupied by the shielding door 13. Furthermore, the shielding door 13 is unduly exposed and prone to sustain accidental damage.

Another plastic optical fiber connector is disclosed in Japan Patent JP-2001-201663. The plastic optical fiber connector includes a housing, a shielding door, and a spring member mounted between the housing and the shielding door. When an optical fiber plug is inserted into the optical fiber connector, the shielding door is pushed open and the spring member is deformed. Spring force is thereby generated in the spring member and exerted on the shielding door. When the optical fiber plug is withdrawn from the optical fiber connector, the spring force of the spring member urges the shielding door to return to its original closed position. Unfortunately, the spring member is prone to break at a point where it interconnects with the shielding door, particularly after it has become fatigued from repeated use. The shielding door is thus easily damaged, and needs frequent replacement.

SUMMARY OF THE INVENTION

In view of the above, an object of the present invention is to provide a plastic optical fiber connector having a durable shielding door which prevents contamination of optical devices inside the optical fiber connector.

Another object of the present invention is to provide a plastic optical fiber connector having a shielding door received in the optical fiber connector once an optical fiber plug is inserted into the optical fiber connector.

In order to achieve the objects set above, a plastic optical fiber connector in accordance with the present invention comprises a housing defining a cavity therein for receiving a complementary optical fiber plug, an active device embedded in a rear of the housing, and a shielding door disposed at a front of the housing. The shielding door comprises two parallel slots defined in opposite side walls thereof, and a shaft extending through the slots. Opposite ends of the shaft are fixed in a front portion of the housing. When the optical fiber plug is to be inserted into the cavity of the housing, the shielding door is manually rotated outwardly and upwardly from a closed position to an open position, and then slid into the housing. Once the optical fiber plug is withdrawn from the optical fiber connector, the shielding door is manually slid outwardly, and then rotatingly returned to its original closed position.

Other objects, advantages and novel features of the invention will become more apparent from the following detailed description when taken in conjunction with the accompanying drawings, in which:

DETAILED DESCRIPTION OF PREFERRED EMBODIMENT OF THE INVENTION

Figure 1:
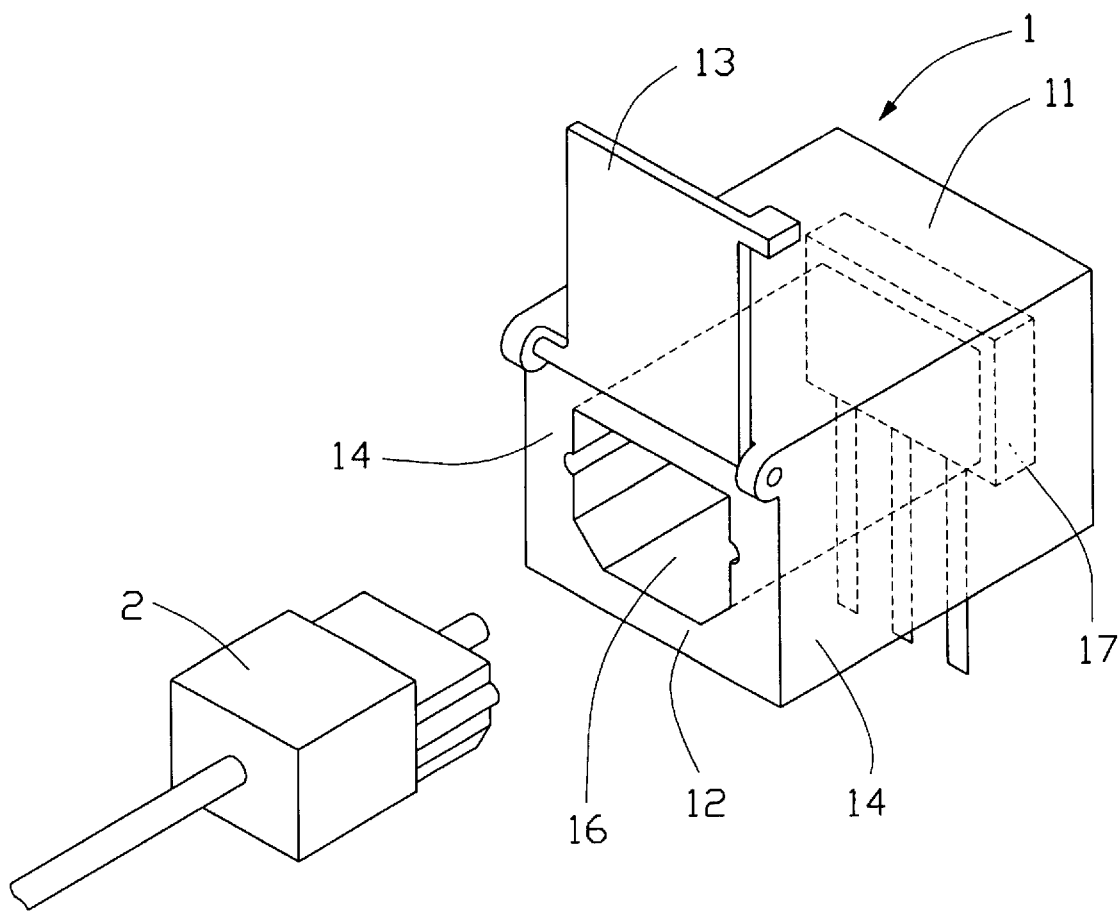
FIG. 1 is a perspective view of a conventional plastic optical fiber connector, together with a complementary optical fiber plug connector.
Figure 2:
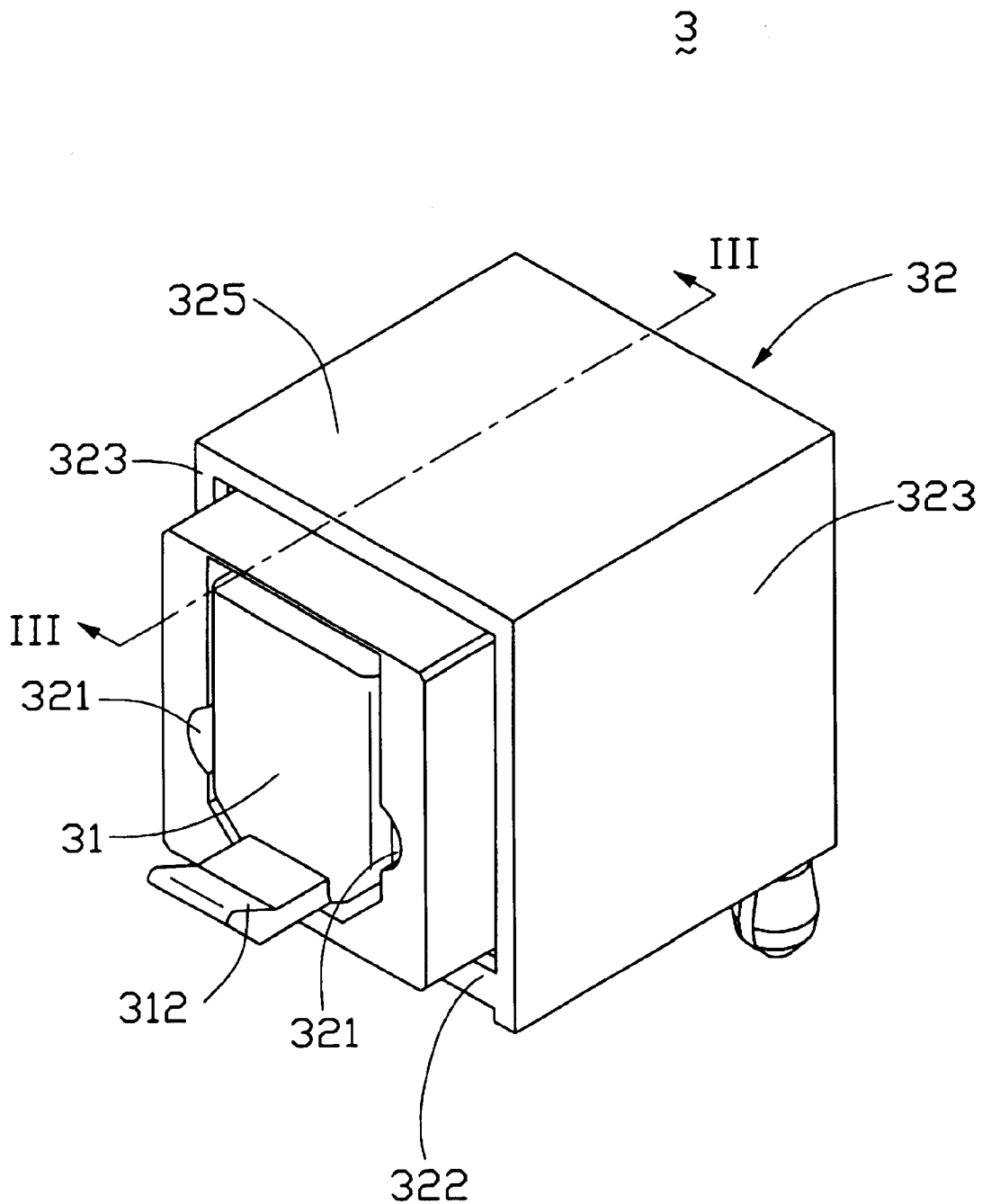
FIG. 2 is a perspective view of a plastic optical fiber connector in accordance with the present invention, showing a shielding door thereof in a closed position.
Figure 3:
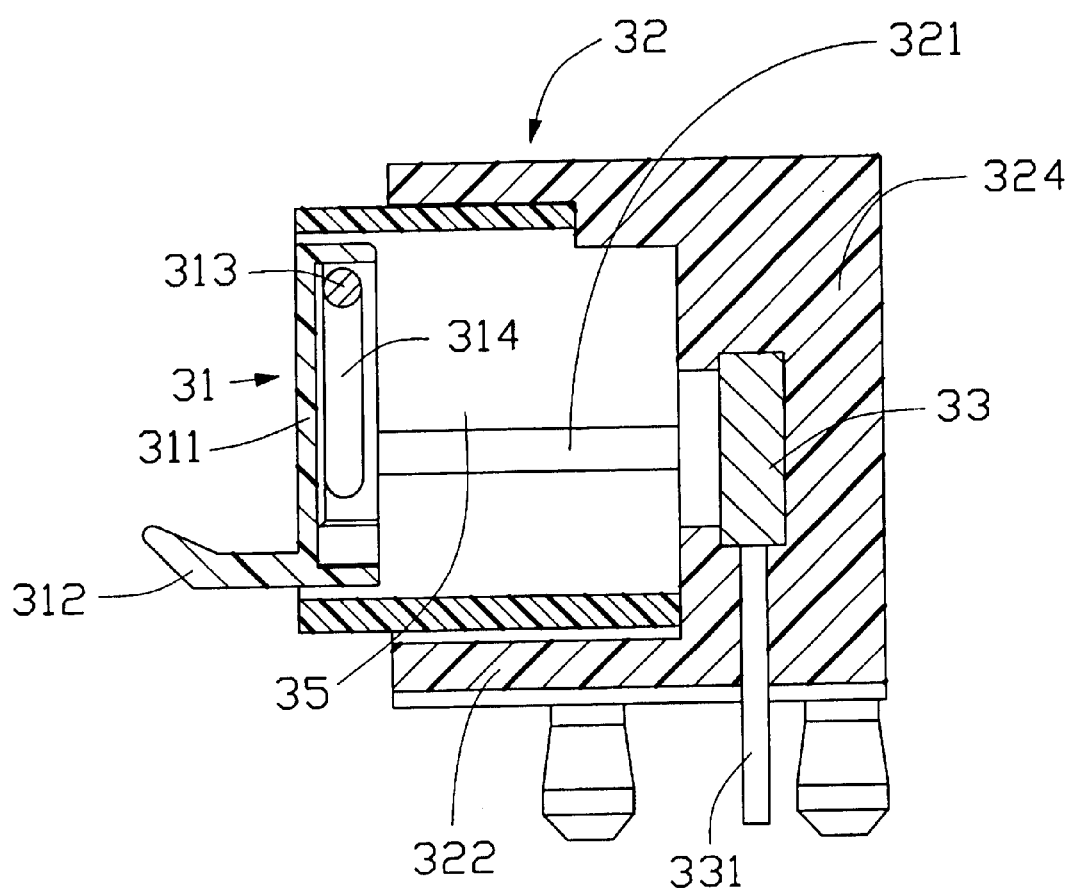
FIG. 3 is a cross-sectional view taken along line III—III of FIG. 2.
Figure 6:
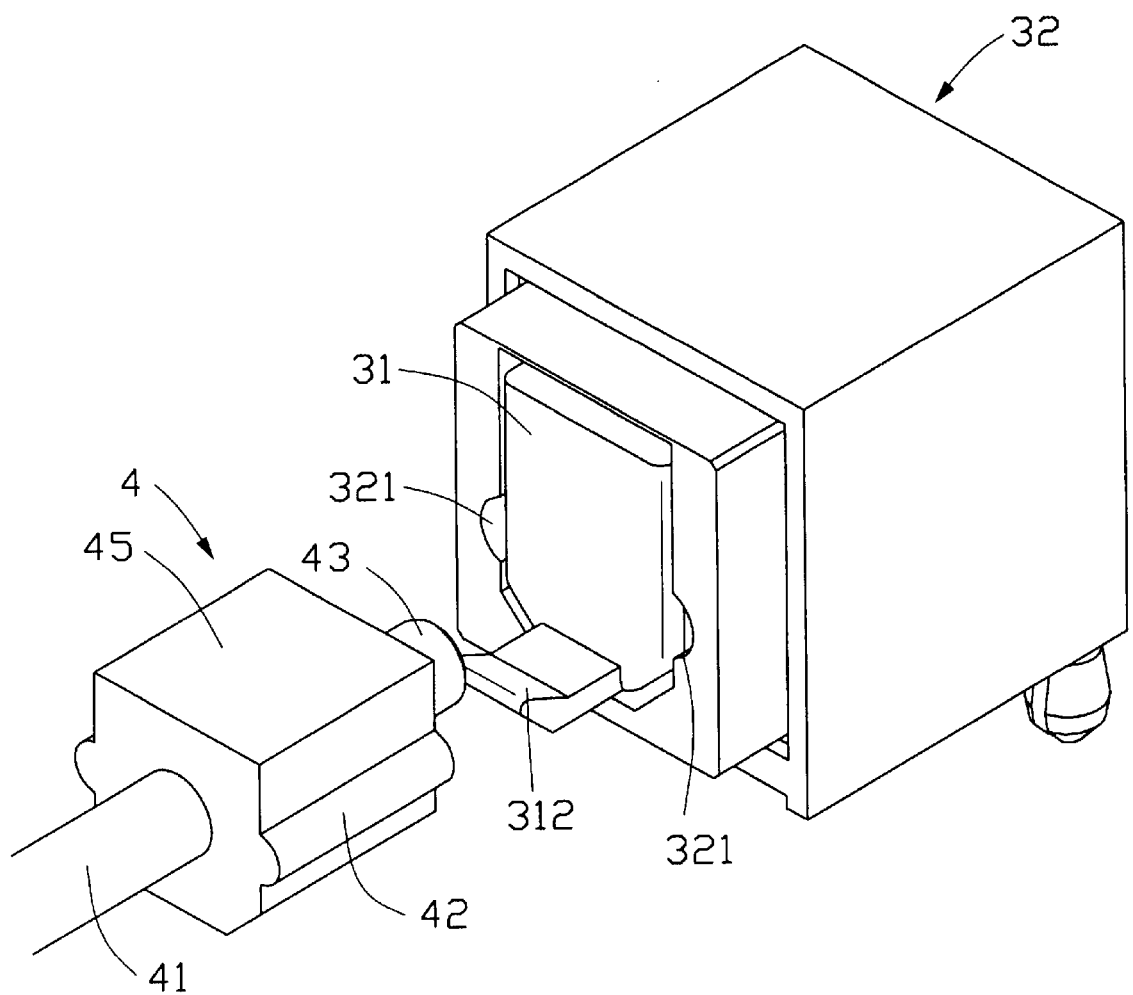
FIG. 6 is similar to FIG. 2, but also showing a complementary optical fiber plug connector.

Referring to FIGS. 2, 3 and 6, a plastic optical fiber connector 3 in accordance with the present invention comprises a housing 32, an active device 33 and a shielding door 31. The housing 32 comprises a bottom wall 322, two sidewalls 323 extending upwardly from opposite sides of the bottom wall 322, a rear wall 324, and a top wall 325. A cavity 35 is defined in the housing 32, for receiving a complementary optical fiber plug connector 4 therein. Two guide grooves 321 are defined in inner surfaces of the sidewalls 323 respectively, for slidably receiving the optical fiber plug 4. The active device 33 is embedded in the rear wall 324 of the housing 32. A plurality of conductive pins 331 of the active device 33 depends outwardly from the housing 32, for electrically connecting with a printed circuit board (not shown). The active device 33 is generally a light-emitting diode or a laser diode for generating optical signals. The active device may alternatively be a photo diode for receiving optical signals and converting the optical signals into corresponding electrical signals. The shielding door 31 is disposed at a front of the housing 32.

Figure 4:
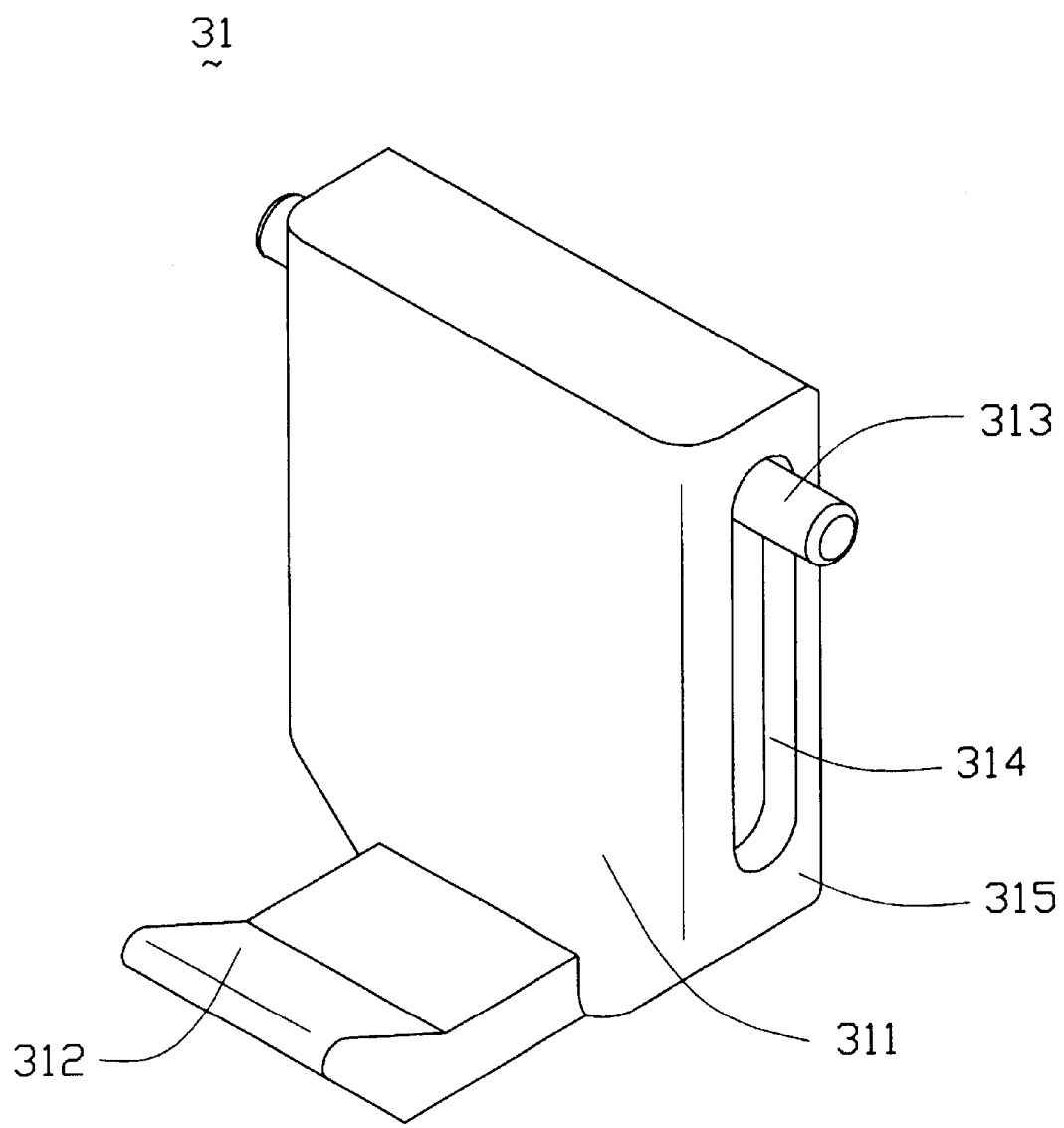
FIG. 4 is a perspective view of the shielding door of the plastic optical fiber connector of FIG. 2.
Figure 5:
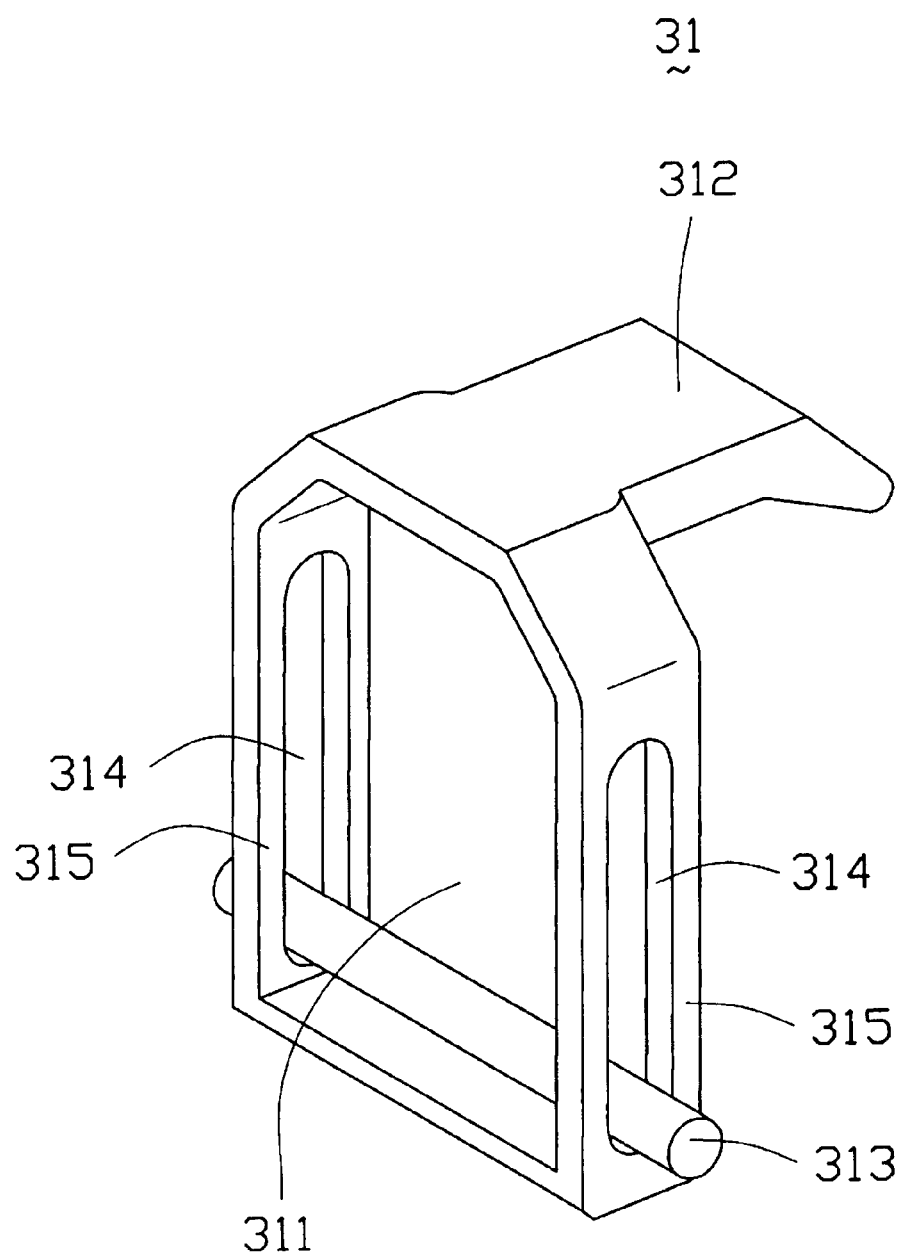
FIG. 5 is similar to FIG. 4, but viewed from another aspect.

Referring to FIGS. 4 and 5, the shielding door 31 comprises a plate 311, two side walls 315 perpendicularly extending in a same direction from the plate 311, a handle 312 extending in an opposite direction from one end of the plate 311, and a shaft 313 disposed at an opposite end of the plate 311. The handle 312 facilitates manual operation of the shielding door 31. Two slots 314 are respectively defined in the sidewalls 315. The slots 314 are parallel and opposite to each other, and movingly accommodate the shaft 313 therein. Opposite ends of shaft 313 are fixed in a front portion of the housing 32. Thus the shielding door 31 is rotatable and slidable with respect to the shaft 313.

Figure 7:
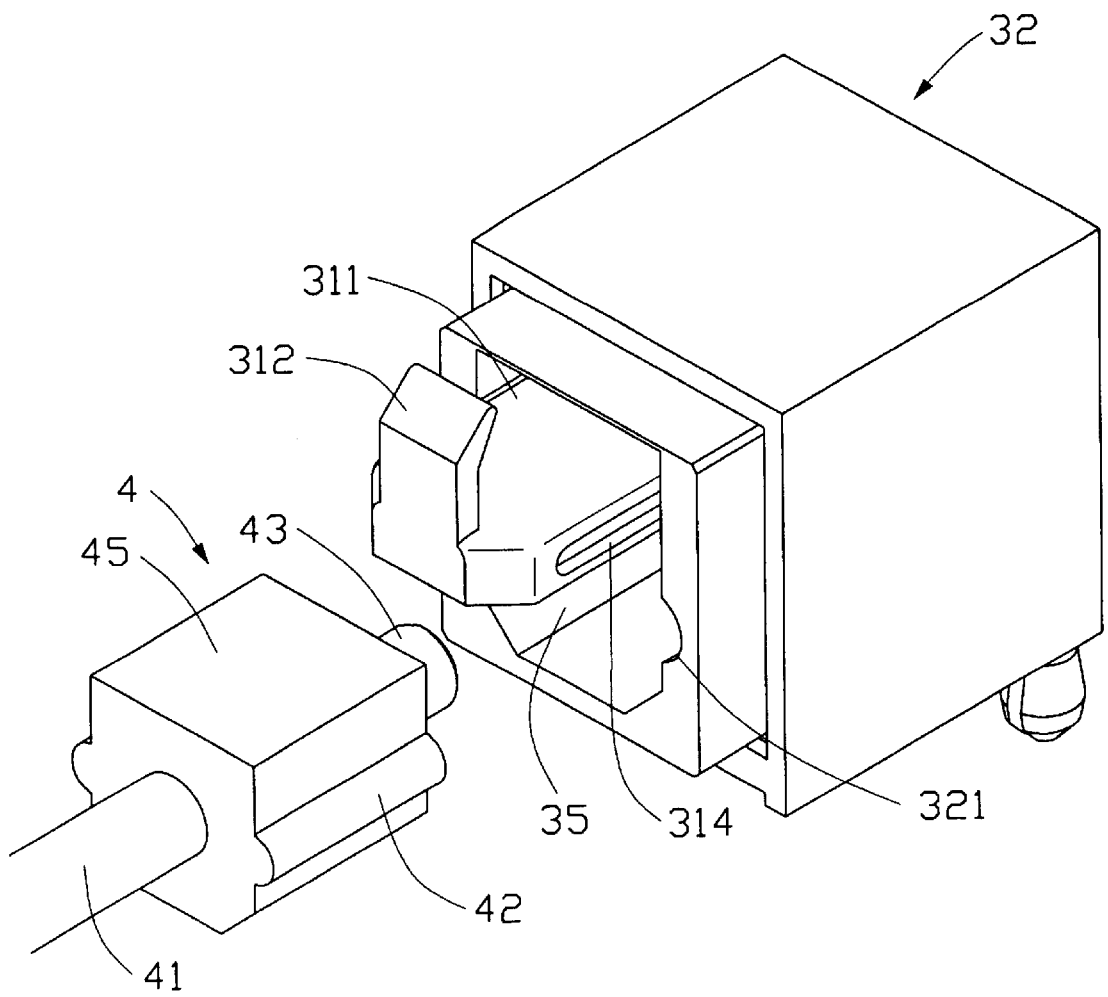
FIG. 7 is similar to FIG. 6, but showing the shielding door in an open position.
Figure 8:
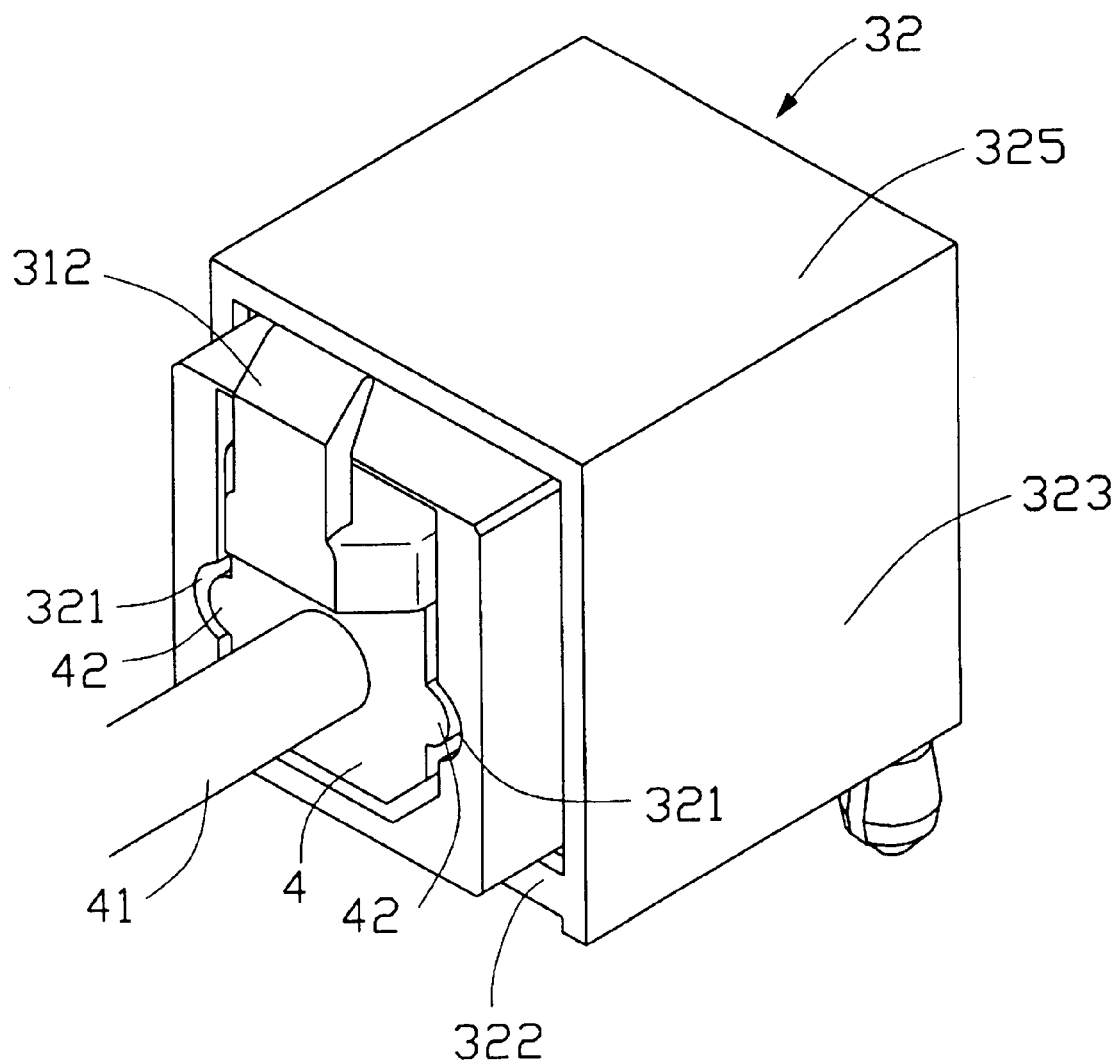
FIG. 8 is similar to FIG. 7, but showing the optical fiber plug connector inserted into a housing of the plastic optical fiber connector, and the shielding door fully inserted into the housing.

Referring to FIGS. 6–8, the optical fiber plug 4 comprises a main body 45, a ferrule 43 embedded in a front portion of the main body 45, and an optical fiber cable 41 retained in a rear portion of the main body 45. The two guide ribs 42 are formed on opposite sides of the main body 45 respectively, for engaging in the guide grooves 321 of the housing 32.

Referring to FIG. 6, when optical fiber connector 3 is not in use, the shielding door 31 is oriented in a closed position. This prevents the active device 33 from being harmed by foreign contamination. Similarly, when the optical fiber plug 4 is withdrawn from the housing 32, the shielding door 31 is manually closed.

Referring to FIG. 7, when the optical fiber plug 4 is to be inserted into the optical fiber connector 3, the shielding door 31 is manually rotated outwardly and upwardly to an open position. In this position, the plate 311 of the shielding door 31 is substantially parallel to the top wall 325 of the housing 32.

Referring to FIG. 8, the optical fiber plug 4 is then inserted into the cavity 35 of the housing 32. The guide ribs 42 of the optical fiber plug 4 are engagingly received in the guide grooves 321 of the housing 32. The shielding door 31 is then pushed into the housing 32, with the sidewalls 315 of the shielding door 31 sliding over the shaft 313 of the shielding door 31. When the shielding door 31 is fully inserted into the housing 32, the handle 312 of the shielding door 31 abuts a front end of the housing 32.

Once the optical fiber plug 4 is withdrawn from the optical connector 3, the shielding door 31 is manually pulled outwardly, and then rotatingly returned to its original closed position.

While the present invention has been described with reference to a particular embodiment, the description is illustrative of the invention and is not to be construed as limiting the invention. Therefore, various modifications to the present invention can be made to the preferred embodiment by those skilled in the art without departing from the true spirit and scope of the invention as defined by the appended claims. For example, in an alternate embodiment the slot may be formed in the housing and the shaft may be formed on the door.

What is claimed is:

1. An optical fiber connector for receiving a complementary optical fiber plug connector, said optical fiber connector comprising:
    a housing;
    an active device embedded in the housing; and
    a shielding door defining at least one slot, the door comprising a shaft extending through the at least one slot and being located in a front portion of the housing;
    wherein the door is rotatable and slidable with respect to the shaft, and when the optical fiber plug connector is inserted into the housing, the door is slidably receivable in the housing.

2. The optical fiber connector as described in claim 1, wherein the door defines two slots disposed opposite to each other.

3. The optical fiber connector as described in claim 2, wherein the door further comprises two sidewalls, and the slots are respectively defined in the sidewalls.

4. The optical fiber connector as described in claim 1, wherein the door further comprises a handle for facilitating manual operation of the door.

5. The optical fiber connector as described in claim 1, wherein the active device is a laser diode.

6. The optical fiber connector as described in claim 1, wherein the active device is a light-emitting device.

7. The optical fiber connector as described in claim 1, wherein the active device is a photo diode.

8. An optical connector for receiving an optical fiber plug connector, said optical connector comprising:
    a housing;
    a shielding door defining at least one slot, the door comprising a shaft extending through the at least one slot and being located in a front portion of the housing;
    wherein the door is rotatable and slidable with respect to the shaft, and when the optical fiber plug connector is inserted into the housing, the door is slidably receivable in the housing.

9. The optical fiber connector as described in claim 8, wherein the door further comprises a handle for facilitating manual operation of the door.

10. The optical fiber connector as described in claim 8, wherein an active device is embedded in the housing.

11. The optical fiber connector as described in claim 10, wherein the active device is a light-emitting device.

12. The optical fiber connector as described in claim 10, wherein the active device is a laser diode.

13. The optical fiber connector as described in claim 10, wherein the active device is a photo diode.

14. A connector assembly comprising:
    a housing defining a cavity therein;
    a plug mateable with said housing; and
    a shielding door moveable relative to the housing with interengaging device; wherein
    when no plug is inserted into the cavity, said shielding door is, in a vertical position, vertically located around a front opening of said cavity to shield said cavity; when the plug is inserted into the cavity, said shielding door is, in a horizontal position, substantially horizontally received in an portion of the cavity and thus is located between said plug and one side wall of said housing in a vertical direction of the housing.

15. The assembly as described in claim 14, wherein said shielding door further includes a handle around an end thereof.

16. The assembly as described in claim 15, wherein said handle is closely adjacently located around one side of said front opening when said shielding door is in the vertical position, and is closely adjacently located around another side of said front opening opposite to said side when said shielding door is in the horizontal position.

* * * * *